United States Patent [19]

Kutryk

[11] 3,844,746
[45] Oct. 29, 1974

[54] POLLUTION CONTROL APPARATUS
[76] Inventor: Edward Adam Kutryk, 3131-57 Ave., S.E., Calgary, Alberta, Canada
[22] Filed: Mar. 22, 1973
[21] Appl. No.: 343,962

[30] Foreign Application Priority Data
Jan. 19, 1973 Canada.......................... 161682

[52] U.S. Cl..................... 55/228, 55/229, 55/238, 55/356, 55/430, 55/456, 55/DIG. 41
[51] Int. Cl............................................ B01d 47/06
[58] Field of Search ............ 55/234, 227, 228, 229, 55/235, 238, 356–358, 430, 456, DIG. 11; 254/93 R; 209/495; 198/113, 126; 15/53; 214/16.1; 134/123

[56] References Cited
UNITED STATES PATENTS

| 1,641,995 | 9/1927 | Schobrone | 55/228 |
|---|---|---|---|
| 2,575,359 | 11/1951 | Ortgies | 55/227 |
| 2,969,851 | 1/1961 | Preeman | 55/238 |
| 2,976,949 | 3/1961 | Murphy et al. | 55/227 |
| 3,248,860 | 5/1966 | Carlson | 55/238 |
| 3,357,576 | 12/1967 | Strombeck et al. | 198/126 |
| 3,409,275 | 11/1968 | Miller et al. | 55/238 |
| 3,419,252 | 12/1968 | Knudsen et al. | 55/238 |
| 3,582,051 | 6/1971 | Klein | 55/228 |
| 3,667,601 | 6/1972 | Johnston et al. | 209/495 |
| 3,690,039 | 9/1972 | Salemink | 55/356 |

FOREIGN PATENTS OR APPLICATIONS
1,202  3/1879  Great Britain...................... 209/260

Primary Examiner—Frank W. Lutter
Assistant Examiner—David L. Lacey
Attorney, Agent, or Firm—Fleit, Gipple & Jacobson

[57] ABSTRACT

A mobile apparatus is described for use in the on-site cleaning of effluent gases, contaminated with solids, for example at asphalt batching plants used in the preparation of paving materials for roads. The apparatus includes a horizontally extending tank, having towing capabilities. A gas scrubbing unit is mounted on the tank for vertical movement between an upper operating position, and a transit position in which the unit is at least partly accommodated within the tank. The tank has an inside bottom, leading in a continuous manner to a sloping end surface of the tank, and dredging means inside the tank are arranged, when driven, to collect sediment deposited on the inside bottom, and move it up said sloping end surface of the tank for discharge from the tank. The scrubbing unit uses water or other liquid from the tank in the form of sprays to clean gas flowing in a helical manner from an inlet near one end of the scrubbing unit towards an outlet near the other hand of the unit.

8 Claims, 19 Drawing Figures

PATENTED OCT 29 1974
3,844,746

FIG.1.

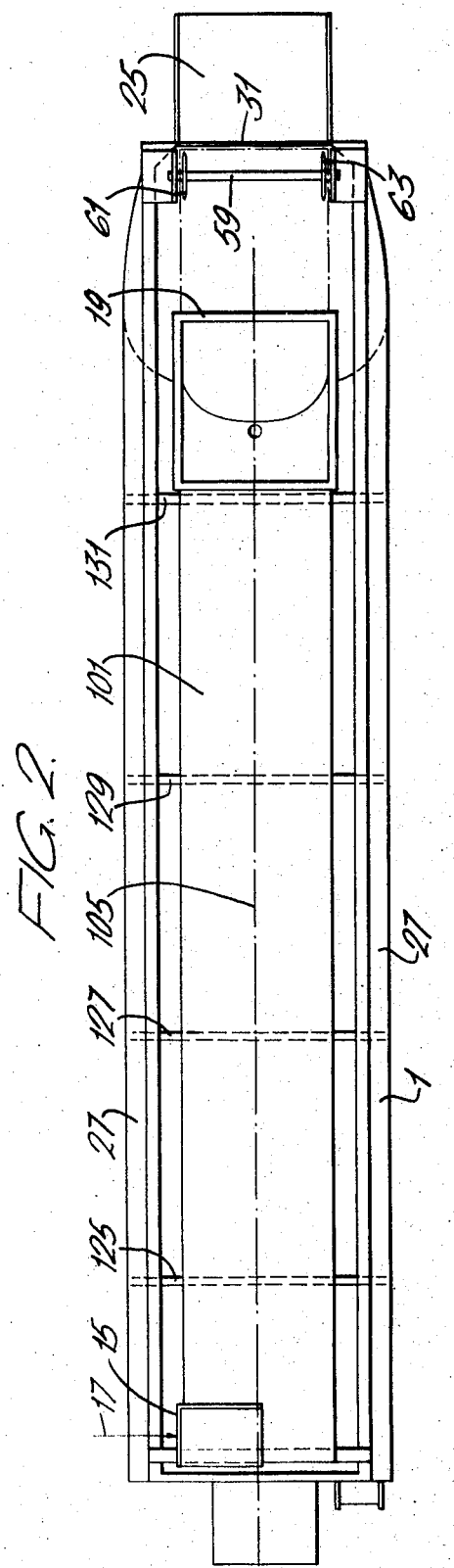

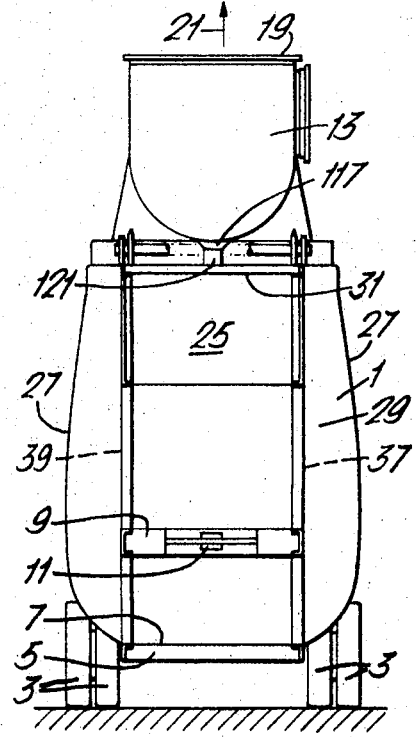
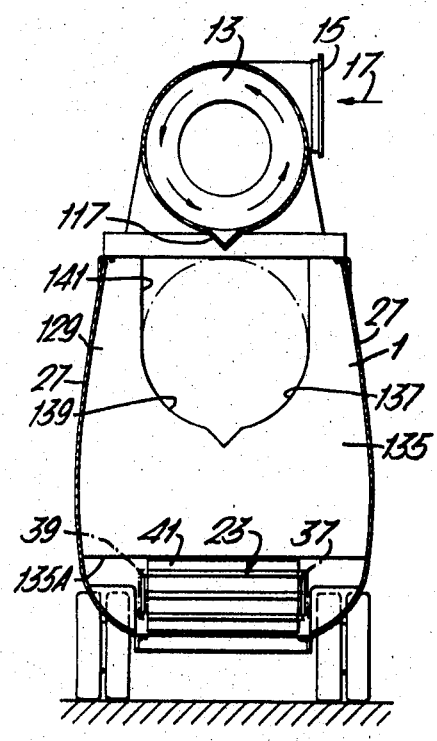
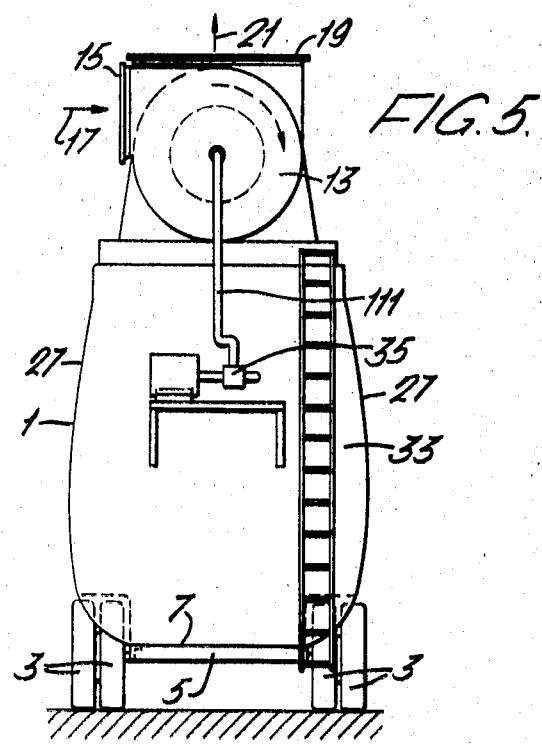

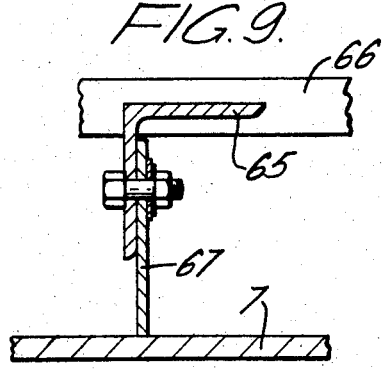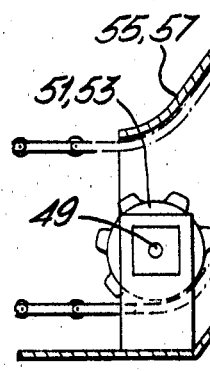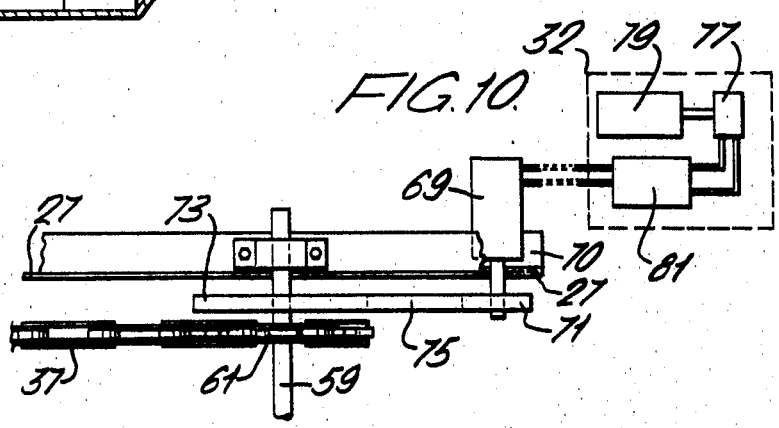

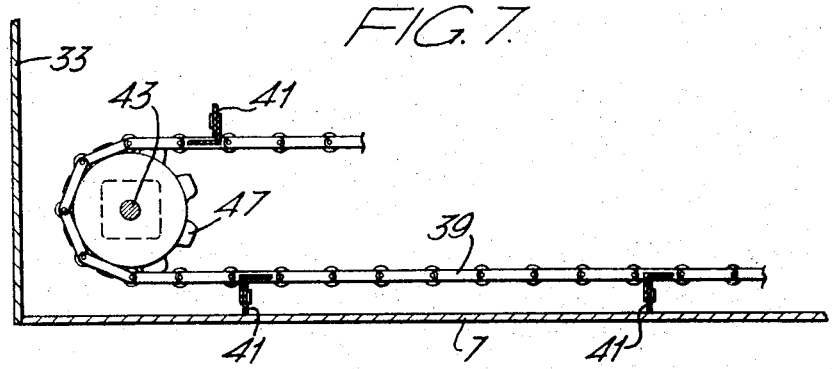
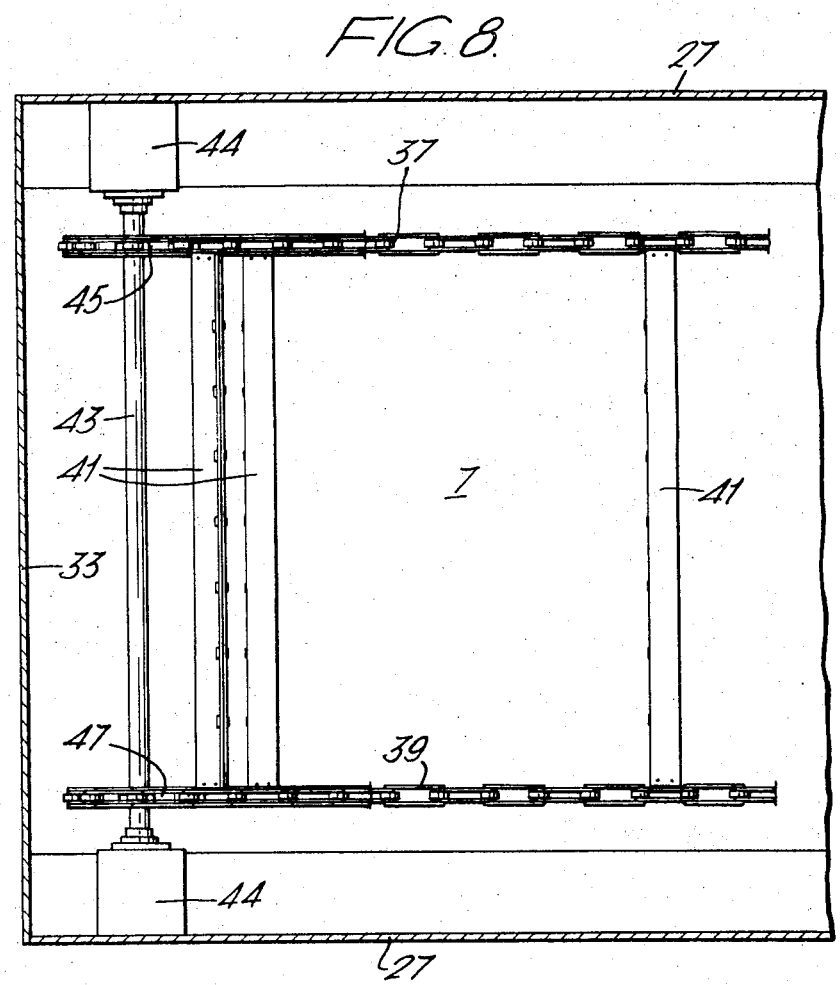

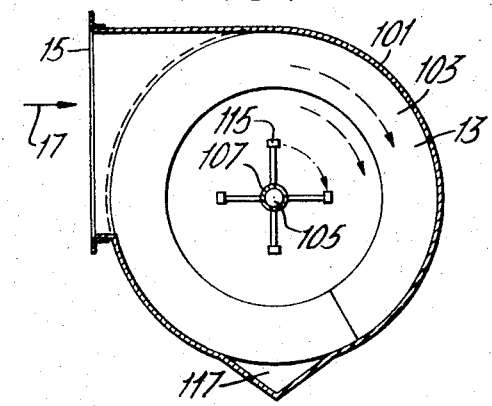
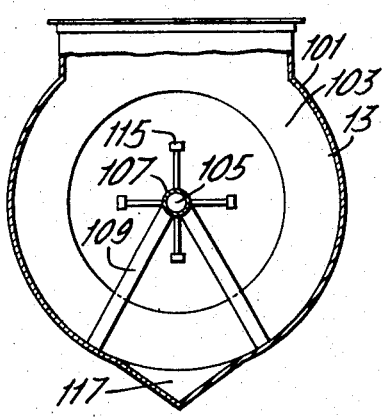
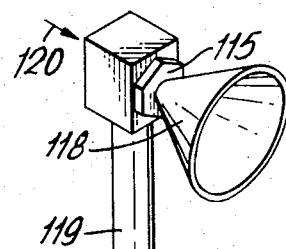
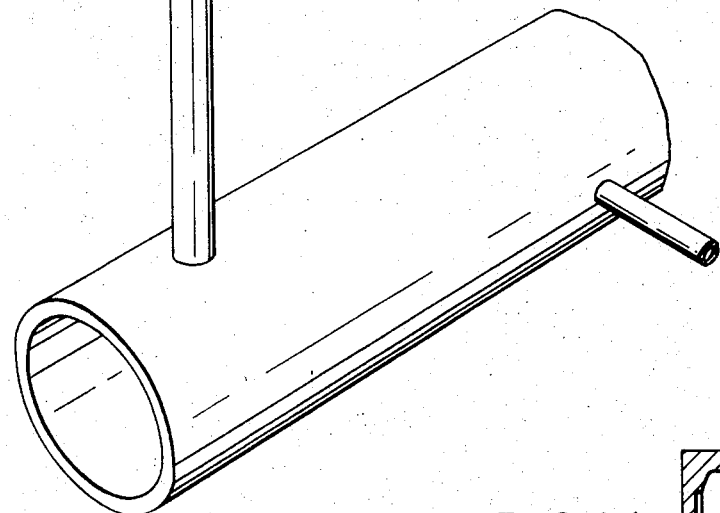
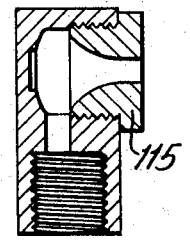

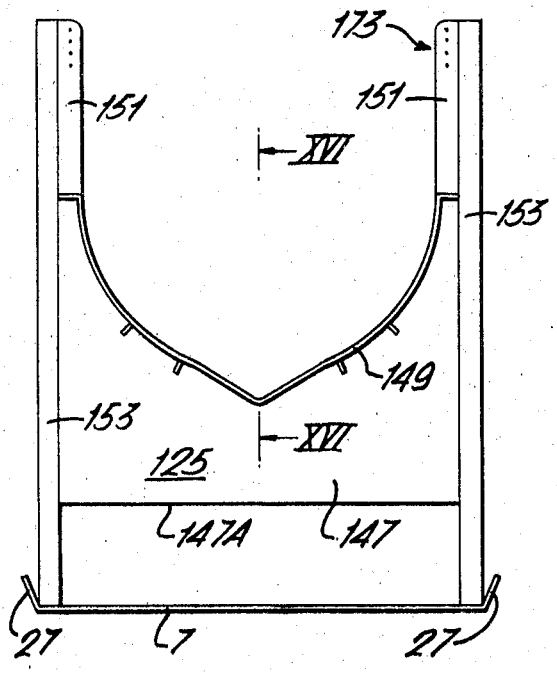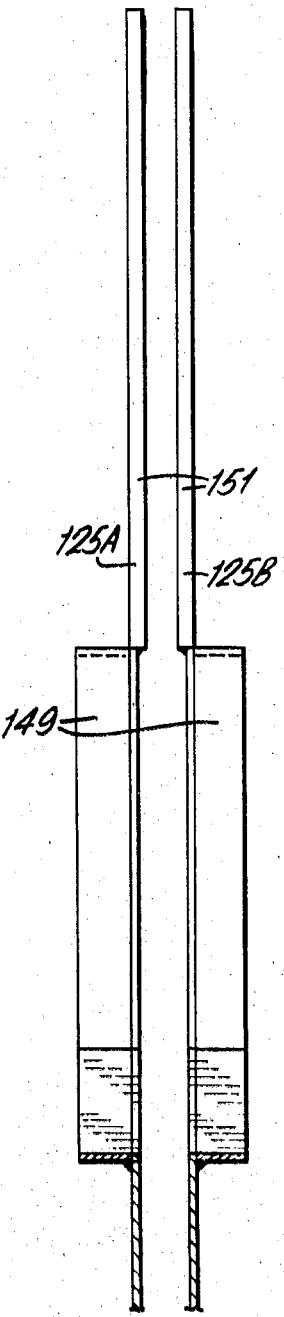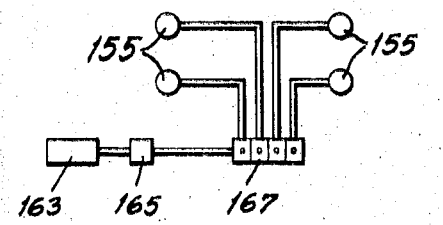

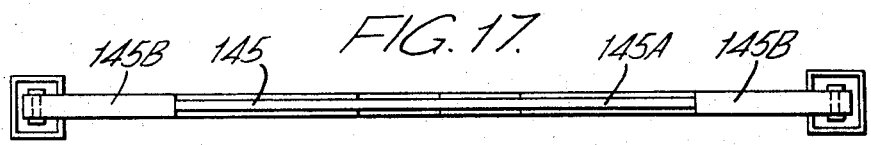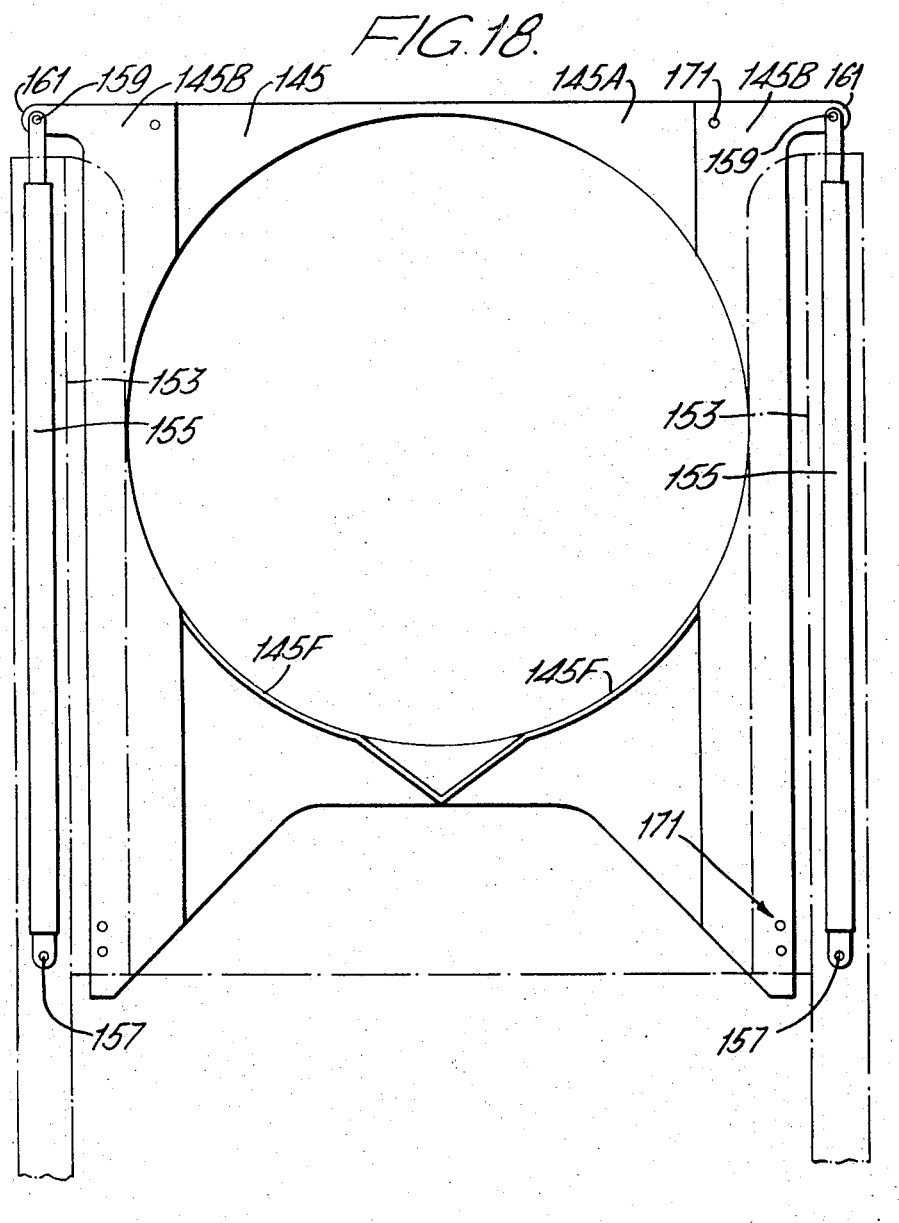

POLLUTION CONTROL APPARATUS

This invention relates generally to apparatus for the cleaning of air or other contaminated gaseous fluids. One particular use of the apparatus is in the purification of air or effluent gas from an asphalt batch plant, but the invention is of general application and use.

In many industrial operations, large volumes of air or other gases are discharged, contaminated with dust or soot particles, and in recent years local, municipal and other governing authorities have made it mandatory that industries discharging effluents which contain contaminants abide by anti-pollution regulations, and purify the effluent down to acceptable levels.

In the case of a factory which remains at one location, and in which the point of discharge of the contaminated gases is fixed, the size, weight and the positioning of the various parts of the gas cleaning equipment do not present any serious problem, but for some circumstances, where the equipment necessarily is mobile, very serious difficulties arise. For example, the anti-pollution regulations also affect the producers of asphalt and aggregate mixes used in the paving of roadways, streets and parking lots, and the operators of such equipment must install devices and systems to clean the effluent from the plant before it is discharged into the atmosphere.

The producers or contractors involved in paving operations may have stationary on-site asphalt batching plants or mobile batching plants. An asphalt batching plant generally consists of a supply of aggregate in the form of crushed rock or gravel, a drying kiln, a kiln feeder conveyor, final crushers and rock size classifier equipment, a conveyor system for moving aggregate from the drier to the crusher, and the mixer or pug mill for mixing the asphalt with the aggregate. When all this equipment is in full operation, a considerable amount of dust, rock particles and fuel residues are produced, and this material, which previously was discharged into the atmosphere, now must be removed from the carrier gases before those gases may be discharged into the atmosphere.

The amount of dust or contamination which is produced depends upon the type, kind and condition of the aggregate. Considerable amounts of dust and contaminant are produced from aggregate which contains a high percentage of fines, i.e., dust, has a high moisture content and contains organic or other combustible matter. In the drying process, generally fuel is used in the form of low grade bunker C oil. The products of combustion of bunker C oil at high temperature include heavy black soot and various gases. The soot and gases combined with dust, rock particles and moisture result in an effluent that can be cleaned only with equipment specifically designed for this purpose. In addition to the contaminants from the drier kiln, there are the dust and rock particles from the crushing and size classifying system which particles are collected by dust collection ducts and delivered to the kiln discharge blower.

For air and gas cleaning apparatus to be usable at mobile paving installations, many conflicting requirements must be met. First, in order to maintain drying kiln efficiency, the least possible back pressure must be set up by the cleaning apparatus on the discharge blower of the kiln, so that a low pressure and efficient system must be provided. Further, since at mobile sites both electrical energy and water are high cost items, the cleaning system must be of a type that requires very little electrical energy to make it operate, and which has a low water consumption. A further major requirement is that the apparatus must be readily transportable from site to site, and that it shall not require excessive labor or time in assembly and disassemble at site.

An object of the present invention is the provision of an improved apparatus for the cleaning of air or other contaminated gaseous fluid, and which meets the requirements set out above.

According to the present invention, apparatus for the cleaning of gas from contaminating material comprises a generally horizontally extending open topped tank; said tank being mounted on wheels so as to be capable of being towed as a wheeled road vehicle from site to site. A generally cylindrical horizontally extending gas scrubbing unit is mounted on the tank in such a manner that it may be moved vertically between an upper operating position above the top of the tank, and a transit position at least partly within the tank. The gas scrubbing unit has gas inlets and outlets at opposite ends thereof, sprays for spraying scrubbing liquid into the gas during flow of the gas from the inlet to the outlet, and a further outlet communicating with the tank for discharging the liquid and scrubbed contaminants into the tank. Partitions extending across the interior of the tank are shaped to co-operate with and to support the gas scrubbing unit in the lower transit position. Dredging means inside the tank, when driven, collect sediment deposited on said inside bottom of the tank and move it to and up a sloping end surface of the tank.

Further objects, features and advantages of the present invention will be readily apparent to those skilled in the art from the following description thereof given by way of example with reference to the accompanying drawings, in which:

FIG. 1 is a side elevation of a mobile gas scrubbing unit and water reclaiming system, arranged in its operational or "non-mobile" state;

FIG. 2 is a plan view of the unit and system shown in FIG. 1;

FIG. 3 is a front view of the unit and system, i.e., as viewed from the right-hand side of FIG. 1;

FIG. 4 is a sectional front elevation taken on the line IV—IV of FIG. 1 and as viewed in the direction indicated by the arrows;

FIG. 5 is a rear view of the unit and system, i.e., as viewed from the left-hand side of FIG. 1;

FIG. 6 is a sectional side elevation of a front or forward end only of a reclaim tank shown in FIG. 1;

FIG. 7 is a sectional side elevation of a lower rear end part only of a reclaim tank shown in FIG. 1;

FIG. 8 is a plan view of the parts shown in FIG. 7;

FIG. 9 is a sectional side elevation of a scraper bar component shown in FIG. 7, but drawn to a much larger scale than in that Figure;

FIG. 10 is a plan view of the left-hand top part only of the reclaim tank and shows the driving means for a scraper assembly indicated in FIG. 1;

FIG. 11 is a transverse cross section of a scrubber unit shown in FIG. 1, taken on the line XI—XI and as viewed in the direction indicated by the arrows;

FIG. 12 is a similar section taken on the line XII—XII of FIG. 1;

FIG. 13 is a perspective drawing of a manifold and spray nozzles shown in FIG. 11;

FIG. 14 is a vertical cross section through a spray nozzle shown in FIG. 13;

FIG. 15 is a front elevation of one of two similar saddles indicated in FIG. 1;

FIG. 16 is a vertical cross section taken on the line XVI—XVI of FIG. 15, and drawn to a larger scale than that Figure;

FIG. 17 is a plan view of one of two similar yokes provided on the scrubber unit shown in earlier figures;

FIG. 18 is a front elevation of the yoke shown in FIG. 17, certain associated parts being indicated in dashed outline; and FIG. 19 is a diagrammatic representation of a hydraulic system used in conjunction with rams shown in FIG. 18.

Figure 1:
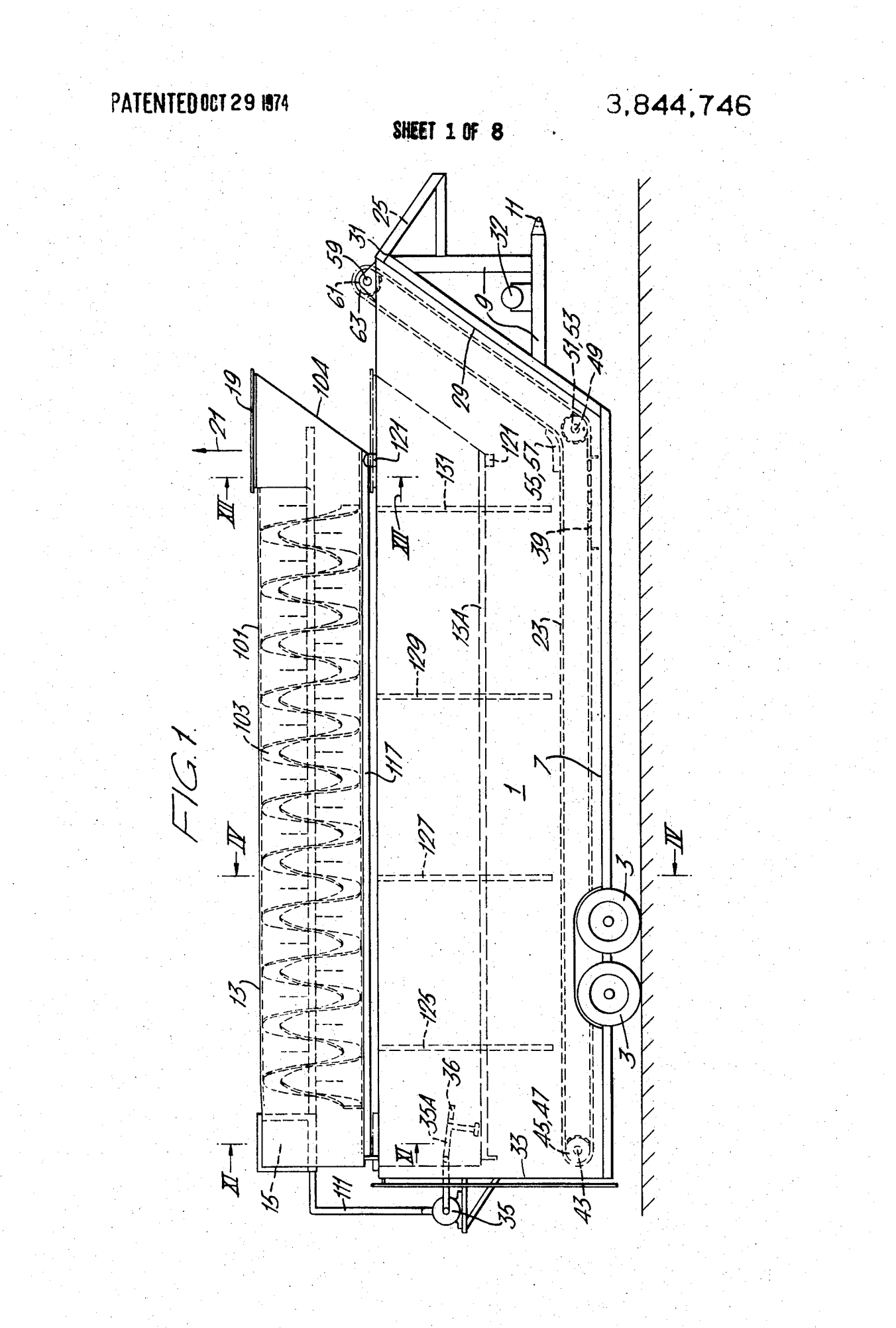

Referring first to FIG. 1, but using the other associated Figures to explain the details of shape and arrangement of the parts referred to, the main structural element is a water reclaim tank 1 designed to be a self-supporting rigid beam both when the apparatus is in transit and when it is in service. The tank is mounted on four sets of double wheels 3, the location of the wheels along the tank being calculated on the basis of tank weight and length. In order that the centre of gravity may be kept as low as possible, the wheel axle assembly 5 is inset into the tank flat bottom 7 as far as is possible. At the forward end of the tank 1 there is provided a forwardly extending arrangement of beams 9 which serve to mount a fifth wheel, a king pin, or the towing coupling 11 illustrated in the drawings.

Mounted on top of the water reclaim tank 1 is a scrubber unit 13 which during use of the apparatus is in the raised position shown in FIG. 1, but during travel of the apparatus is lowered into the tank 1 into the position indicated in dashed outline 13A in FIG. 1. Before describing the various parts in more detail, it will be of assistance to appreciate that contaminated gases enter the rear end of the scrubber unit 13 through a lateral inlet 15, as indicated by the arrow 17; the gases pass along the scrubber unit 13 towards its forward end while being scrubbed by water jets and centrifugally cleaned, discharging upwardly through a top gas outlet 19 as indicated by arrow 21. The water used in scrubbing the gases flows back rearwardly along the floor of the scrubber unit 13 and falls down into reclaim tank 1. In the tank, particles settle out and are dredged by a scraper assembly 23 and are finally discharged from the tank over a discharge chute 25. Water from the tank is pumped back to the scrubber unit 13 to serve in the scrubbing water jets.

Considering now the water reclaim tank 1 in more detail, the overall length of the tank will normally lie in the range from 35 feet to 50 feet, depending partly on volume requirements but also on the requirements imposed by its ability to travel on public roadways from site to site. Typically the tank will have a gross volume of about 25,000 Imperial Gallons, and while in operation the tank will usually contain between 22,000 and 24,000 Imperial gallons. In cross section, the tank is partly curved, being somewhat pear shaped, as seen most clearly in FIGS. 3, 4 and 5. Since the side walls 27 are curved, a given thickness of material is sufficient to withstand the hydrostatic pressure with less reinforcement than would be required if a straight side wall of the same thickness were used. The shape of the side wall is arrived at through calculations based on maximum tank width allowance, open top requirements, flat bottom requirement and the hydrostatic pressure on the side walls due to the maximum depth of water in the tank. The flat bottom 7 is provided for separating solids to settle onto, and in order that the scraper assembly 23 may have a flat surface for its scrapers to move the solids along forwardly towards the discharge chute 25. The forward end 29 of the tank is flat but is sloped upwardly and forwardly at an angle of approximately 45°. This is done so that the scrapers can carry separated solids up and over the front end or lip 31 of the tank for discharge into chute 25. The front end is suitably braced by certain structural members associated with beams 9. These structural members also provide both space and platforms for a hydraulic pump and motor system 32 for driving the scraper assembly 23. The rear end wall 33 of the tank 1 is a straight vertical wall suitably reinforced with structural members to withstand the hydrostatic pressure on its flat surface. If desired, the rear end 33 can also provide a mounting for a high pressure water discharge pump 35 which delivers water to scrubber manifold connections, described below, from the inside of tank 1. A water inlet pipe 35A in tank 1 is carried by a float 36 so that it is submerged in use.

The scraper assembly 23 is designed to remove the settled-out solids from the inside of the water reclaim tank 1. This assembly includes (see FIGS. 7, 8 and 9) two endless chains 37 and 39 disposed respectively close to and running along the lower parts of the two side walls 27 of the tank 1. The two chains include upper and lower runs, and opposite parts of chains 37 and 39 are connected together by rigid scraper bar components 41 spaced apart evenly along the chains at a pitch of about 6 feet. The chains are carried by, and maintained in synchronism with one another, by sprockets mounted fixedly on axles. Thus an axle 43 carried on suitable brackets 44 inside the rear end of the tank 1 adjacent the rear wall 33 extends across the tank and carries sprockets 45 and 47 respectively at its ends, said sprockets engaging chains 37 and 39. Near the bottom of the inclined forward end 29 of the tank 1 (see FIG. 6) a second axle 49 extends across the tank and carries fixed sprockets 51 and 53. The lower runs of chains 37 and 39 engage the underside of the sprockets, but the upper runs, under a slight tension, are lifted clear of these sprockets and respectively run against curved superjacent guide members 55 and 57. A further axle 59 extends across the top of the tank adjacent the top of forward end 29 of the tank, and carried fixed sprockets 61 and 63 round which extend respectively the forward ends of the two chains 37 and 39.

The scraper bar components 41 mentioned above each consist (see FIG. 9) of an angle iron member 65 welded at its ends to the appropriate links 66 on the two chains. A rubber wiper or scraper 67 is bolted or rivetted to the member 65, and the arrangement is such that the scraper 67 normally rubs along the flat floor of the tank, but can flex if necessary to permit the scraper bar to ride over any really hard deposits on that floor.

The scraper assembly 23 is driven (see FIG. 10) by a hydraulic motor 69 mounted on a channel member 70 forming part of a forward extension of a side wall 27 and driving the axle 59 through a mechanical arrangement of two chain sprockets 71 and 73 and an endless chain 75. It is desired that the scraper assembly 23 be driven at very low but variable speeds, and by the use of a hydraulic pump 77 driven by an electrical motor 79 and driving the motor 69 through hydraulic valves 81, these requirements can be met.

The scrubber unit 13 is in the form of a horizontal cylindrical casing or drum 101 with a continuous helical flighting 103 attached to the inside of the drum through substantially the entire length of the drum. The diameter and length of the drum are based on the capacity and the air flow requirements. A drum 68 inches in diameter with an overall length of about 44 feet and four inches is required to handle 50,000 cubic feet of gas per minute. As will be seen from FIG. 1, the forward end 104 of the drum 101 is sloped forwardly and upwardly, conveniently at the same angle as the front wall 29 of the tank 1. The rear end wall of the drum is vertical and this end of the drum is provided, in the embodiment shown, with a lateral air inlet duct, the inlet 15 referred to previously. This air inlet is so arranged that gases enter the rear end of the drum tangentially, as shown most clearly in FIG. 11, so that the kinetic energy of the incoming gas will cause the gas to be directed in a swirling motion about the axis 105 of this drum. The pitch of the spiral flighting 103 is thirty six inches per complete revolution along the length of the drum, and the entering gases pass along the drum with a helical motion towards the front end of the drum. Extending axially along the drum 101 is a high pressure water manifold 107 supported (see FIG. 12) on pairs of brackets 109 of tubular or streamline cross section at spaced points along its length. To the rear end of this manifold is connected a water supply pipe 111 leading from water pump 35, and at the front end the manifold is blocked with a suitable plug. At spaced intervals along its length the manifold 107 is provided with spray nozzles 115. Near the sloping end 104 of the drum is disposed the gas outlet 19 referred to previously herein.

In operation, the water discharged from the manifold nozzles 115 should drain back to the tank 1, and to this end the drum 101 is not truly cylindrical, but as shown in FIGS. 11 and 12 in particular, has its lower part shaped as a trough 117. The valley bottom or trough 117 consists of a "V" shaped trough section, approximately 12 inches wide and 7 inches deep. It will be appreciated that the flighting 103 does not extend into the trough 117, leaving a water flow path below the flighting and thus not in any way impeded by the flighting.

The water manifold 107 is a long and round tubular section formed by 4 inch standard pipe, and is located on the horizontal centre line throughout the entire length of the scrubber drum. Since the nozzles are spaced 9 inches apart along the manifold and each nozzle is displaced 90° relative to the preceding nozzle. Thus there are four nozzles for each 36 inch pitch or spiral of the flighting. The manifold is of sufficiently large cross section, in terms of the nozzles used, to ensure a sufficient head of pressure along the length of the manifold.

Each spray nozzle 115 (see FIG. 13) has a hollow conical shaped water spray pattern 118 and each nozzle is mounted on the outer end of a pipe nipple 119 having a length of about 8 inches. The spray direction of each nozzle is in the same direction as the flow (see arrow 120) of contaminated air and in the same rotary direction as the spiral flighting 103. Thus the velocity of the spray water leaving the nozzle assists in propelling the contaminated air through the drum 101. The water spray causes droplets of water and solid particles to collide, so that they can coalesce and then impinge on the inner cylindrical surface of the drum 101 or on the flighting 103. Both their impetus and the force of gravity cause these coalesced particles to flow to the drain trough 117. At its forward end, adjacent the sloping end wall 104, a drain 121 is provided in the trough 117, and the water and the collected solids drop down through drain 121 into the reclaim tank 1. Nozzle 115 is a commercially available device, and its structure is shown in FIG. 14.

The gas outlet 19 is provided with a cross sectional area which is at least 20 per cent greater than the cross sectional area of the air inlet 15, and in turn the area of inlet 15 is made approximately 20 per cent larger than the area of the blower discharge which will be used with the unit being described. This system of increasing cross sectional area of the air flow openings through the scrubbing unit makes it possible to maintain proper operation with a very low pressure drop from the inlet to the discharge. If desired, the gas outlet 19 can be made still larger and provided with a low pressure, high velocity water stripper in the form of wire mesh pads, or corrugated vanes. The function of such a stripper is to remove from the outgoing gases as much of the entrained water particles as is practical. Another alternative is to provide in the gas outlet a centrifugal separator driven by an electric motor and serving to separate water particles by the action of centrifugal force. Such a power driven stripper can be arranged so that it does not produce any back pressure, but, in fact, assists in the discharge of gases from the scrubber drum 101.

As explained earlier, FIG. 1 shows the scrubber drum 101 in its upper, operating position, and in dashed outline 13A shows the transit position of the scrubber unit, in which it lies substantially completely within the tank 1. When in the transit position, the scrubber unit 13 rests on four transverse saddles designated 125, 127, 129 and 131 and arranged at spaced intervals between the rear wall 33 and the front end 29 of the tank 1. These saddles are designed to serve several purposes, namely:

1. the saddles support the scrubber unit 13 inside the reclaim tank 1 when the unit 13 is in the transport position;
2. the saddles serve as reinforcement cross members for the side walls 27 of the tank 1;
3. the saddles act as baffles to decrease water movement and to quiet the water at or near the bottom of the tank, when the unit is in operation, thus resulting in more effective settling-out of the solids from the water; and
4. some of the saddles also contain or house hydraulic cylinders that are used to elevate and to lower the scrubber unit 13 between the transit position and the operating position.

The two innermost saddles 127 and 129 are similar simple supports, and their form will be clear from FIG. 4. Thus saddle 129 consists of a vertical plate 135 which extends upwardly from a horizontal lower edge 135A which is at such a level that it is not quite contacted by the scraper components as they travel rearwardly in the tank 1. A U-shaped aperture 137 in an upper part of the plate is shaped to accomodate the lower contour of the drum 101, including the trough 117, and this edge is provided with a flange 139 extending both ways from the plate, to provide an ample bearing surface for the lower surface of the unit 13 when it is resting on the saddles. The upper parts 141 of the aperture 137 also have such flanges, and they serve to guide the scrubber unit 13 as it is raised and lowered.

The two saddles 125 and 131 are similar to one another, and FIGS. 15 and 16 show the construction of saddle 125, and FIGS. 17 and 18 show the construction of a yoke 145 associated with the scrubber drum 101. Saddle 125 is formed of two parallel elements 125A and 125B spaced a short distance apart, axially of tank 1, so that side parts of yoke 145 can slide up and down between the two elements. Element 125A, for example, consists of a vertical metal plate 147 having a horizontal lower edge 147A at such a level that it is not quite contacted by the rearwardly moving scraper components 41. The upper edge of the plate is shaped to accommodate the appropriate parts of the drum 101 and yoke 145, and is provided with an outwardly extending flange 149 to provide an adequate bearing surface. The flange ends at about the level of the axis of drum 101, when in the lowered position, and the plate 147 is continued upward as a rather heavier plate 151. It will be seen from FIG. 16 that the plates 151 respectively of elements 125A and 125B form a vertical guide or slideway for the yoke 145.

Yoke 145 consists of a central part 145A of steel plate, one half inch thick, and two edge parts 145B formed of steel plate 1 inch thick. The assembly of plates is cut away to accept the drum 101, and the weight of the drum 101 is carried by the flanges 145F. Outwardly of each side of the saddle 125 is provided a vertically extending box 153 containing a hydraulic ram 155. One end of the ram acts through a pin 157 on the sides of the box, and thus on the floor of the tank 1 to which the box extends, while the other end of the ram acts on a pin 159 carried by a lateral extension 161 on the yoke 145. It will be appreciated that there are four such rams 155 in all, and that by the regulated supply and release of hydraulic fluid, these rams can raise and lower the scrubber unit 13. FIG. 19 illustrates diagrammatically a hydraulic system consisting of an electric motor 163 driving a hydraulic pump 165 and a set of valves 167 permitting the independent operation of the four hydraulic rams 155. By the provision of independent control, one end of the scrubber unit, the inlet end, can be raised somewhat more than the front end, if so desired, to improve the drainage of water and solids along the trough 117. Holes 171 provided in yoke 145 and holes 173 provided in the saddle 125 accept pins in any one of a number of possible positions, so that maintenance of the scrubber unit 13 in a desired position is not dependent upon maintenance of hydraulic pressure in the unit.

It is believed that the operation of the apparatus will be clear from the above description. First the complete apparatus is towed by a suitable tractor to the desired point of use, the scrubber unit 13 being in the lowered position 13A shown in FIG. 1. No water will be contained in the tank 1, in view of the practically uncontrollable forces set up by any large volume of water on sudden braking of the equipment. At the point of use, it will usually be considered desirable to use jacks and blocks to level the floor 7 of the apparatus after disconnecting the tractor. The jacks 155 are then used to raise the scrubber unit into the proper operating position, with a slight forward inclination, as described above, if so desired a slope of 0.25 inch per foot has been found beneficial. Pins are then inserted through the appropriate holes 171 and 173, and the hydraulic pressure to the rams can be discontinued. The pipe 111 is connected to the manifold 107, and the appropriate amount of water fed from an outside source into the tank 1. The inlet 15 and the outlet 19 are coupled to the appropriate ducting. The scraper assembly 23 is set in operation, and the apparatus is then ready to accept contaminated gases for cleaning.

The contaminated gases enter through inlet 15, and in passing along the scrubber drum 101 they are impacted by the jets from the nozzles 115. Water with entrained particles flows along the trough 117, under the convolutions of the flighting 103, and falls through drain 121 into the tank 1. The water velocity in the tank 1 is low, partly because of its large volume and partly because of the baffle action of the saddles 125 through 131. The solid particles therefore tend to sediment out of the water, as the water flows slowly back toward the inlet pipe 35A of the pump 35. The sedimented particles are picked up and moved forwardly as a sludge by the scraper components 41 moving forwardly with the lower runs of the two chains, and is dragged up the front tank wall 29 and discharged over lip 31 into the chute 25. The material discharged from the chute as a slurry is disposed of in any suitable manner.

Although one embodiment of the invention has been described in some detail above, this is of course by way of example only, and it will be clear to those skilled in the art that a number of variations can be made to the equipment described. For example, the rams used to elevate the scrubber unit can be replaced with cable systems; use can be made of external cranes to lift the scrubber unit; or pontoons can be provided on the bottom of the scrubber unit so that the unit is lifted into place as the tank 1 is filled with water.

The apparatus can be used to clean gases other than air, and in some situations it may be desirable to use a liquid other than water in the tank 1 and therefore in the sprays 115. Any such liquid must be of reasonably low viscosity so that it will readily drain back into the tank 1.

In the embodiment shown and described above, the contaminated gases enter the scrubber unit 13 from one side, and this enables the kinetic energy of the gases to be used to produce rotation of the gases in the scrubber 13. In some instances, it may be more convenient to feed the contaminated gases axially into this end of the scrubber unit, and in that case guide vanes can be used to cause the gases to enter the scrubber unit with a desired swirl or rotation about the axis 105 of the scrubber unit.

By means of the apparatus described above, efficient gas cleaning can be provided for on-site use, and this apparatus is economical in water and electricity requirements, and can be assembled for use and prepared for transit to a subsequent site with little expenditure of labor or time. In this connection, it will be appreciated that removal of water before transit can be effected through drain valves provided in or near the floor of the tank, or by the use of external pumps, or by using the pump 35 to pump out the water from the tank to a suitable storage tank or to waste.

It will be appreciated that alternative embodiments may be utilized without departing from the spirit and essence of this invention. For example the tank 1 may be provided with a trough type or valley type bottom for removal of settled-out solids using either screw conveyor or draw-off openings.

It will be readily apparent that the development described above represents a distinct advance in the art which will be of benefit to the public and industry generally.

The embodiments of the invention in which an exclusive property or privilege is claimed are defined as follows:

1. Apparatus for cleaning contaminated gas, comprising, in combination,
   a generally horizontally extending gas scrubbing unit for scrubbing contaminants from the gas;
   a generally horzontally extending open topped tank for receiving the scrubbed contaminants from said gas scrubbing unit;
   said gas scrubbing unit comprising an inlet at one end of said gas scrubbing unit for the flow of the contaminated gas into said gas scrubbing unit;
   means for discharging a spray of liquid through the gas during passage of the gas through said gas scrubbing unit for scrubbing contaminants from the gas;
   a first outlet at the opposite end of said gas scrubbing unit for the flow of the scrubbed gas from said gas scrubbing unit; and
   a second outlet communicating with said tank for discharging the liquid and scrubbed contaminants from said gas scrubbing unit into said tank;
   said tank being dimensioned to accommodate at least a substantial portion of said gas scrubbing unit in said tank;
   means for supporting said gas scrubbing unit on said tank; and
   means in the lower portion of said tank for dredging the contaminants from the bottom of said tank;
   said supporting means comprising means for supporting said gas scrubbing unit in a lower, transit position, in which at least a substantial portion of said gas scrubbing unit is accommodated in said tank;

means for supporting said gas scrubbing unit in an upper, operating position, in which said gas scrubbing unit is disposed above said lower, transit position; and
   means for effecting vertical movement of said gas scrubbing unit between said upper and lower positions; and
   said tank being provided with a plurality of wheels for supporting said tank and said gas scrubbing unit during transit of the apparatus.

2. Apparatus as claimed in claim 1, wherein said means supporting said scrubbing unit in said transit position comprises generally vertical plates extending transversely of the interior of said tank and partitioning the tank interior, said plates being spaced from the bottom of said tank and having upper bearing surfaces shaped to conform to the underside of said gas scrubbing unit for supporting the latter in said lower position.

3. Apparatus as claimed in claim 2, wherein at least two pairs of said plates are provided, the plates of each pair being closely spaced, said lifting means comprising a pair of yokes secured to said gas scrubbing unit and vertically slidable between said pairs of plates, whereby said plates guide said yokes during vertical displacement of said gas scrubbing unit relative to said tank, said raising and lowering means comprising hydraulic rams connected between said yokes and said tank.

4. Apparatus as claimed in claim 2, further comprising flanges extending generally horizontally from the upper edges of said plates and forming said bearing surfaces.

5. Apparatus as claimed in claim 2, wherein said dredging means comprise a scraper assembly within said tank for removing sediment from the bottom of said tank, said scraper unit comprising a plurality of scraper bars extending transversely of said tank, endless chain means for displacing said scraper bars along the bottom of said tank, said endless chain means extending longitudinally of said tank and beneath said plates, and means for driving said endless chain means.

6. Apparatus as claimed in claim 1, wherein said support means supporting said unit in its upper position comprises yokes secured to said gas scrubbing unit, and said raising and lowering means comprise hydraulic rams connected between said yokes and said tank.

7. Apparatus as claimed in claim 1, and further comprising pump means for recycling the scrubbing liquid from said tank to said gas scrubbing unit.

8. Apparatus as claimed in claim 1, wherein said gas scrubbing unit comprises a generally horizontal cylindrical casing, a helical flighting extending inwardly from the inner surface of said cylindrical casing, and means defining a trough extending within said cylindrical casing and beneath said helical flighting along the bottom of said cylindrical casing, said spray discharging means comprising a water manifold extending axially of said cylindrical casing, a plurality of spray nozzles spaced apart along said manifold and communicating with said manifold for discharging sprays of water within said cylindrical casing.

* * * * *